T. BOVEY.
VEHICLE HEATER.
APPLICATION FILED FEB. 19, 1915.
1,194,473.
Patented Aug. 15, 1916.
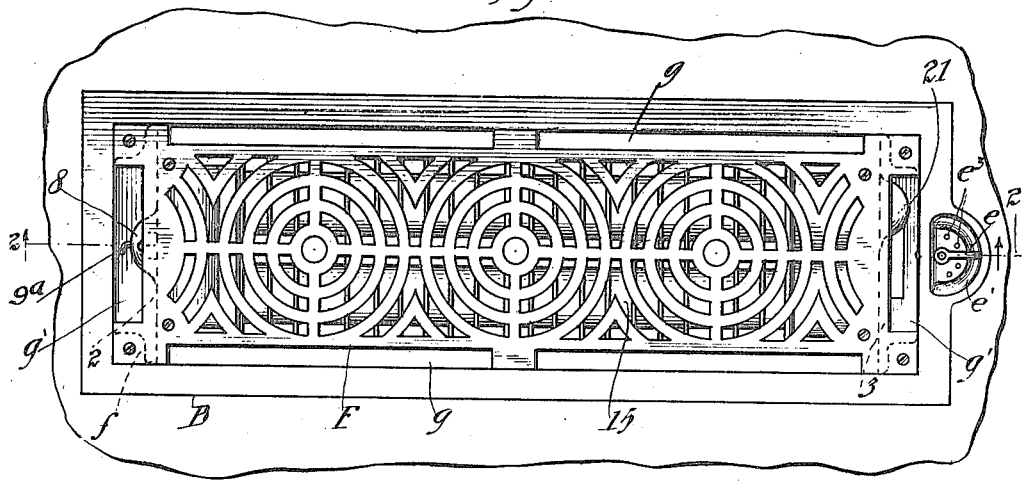
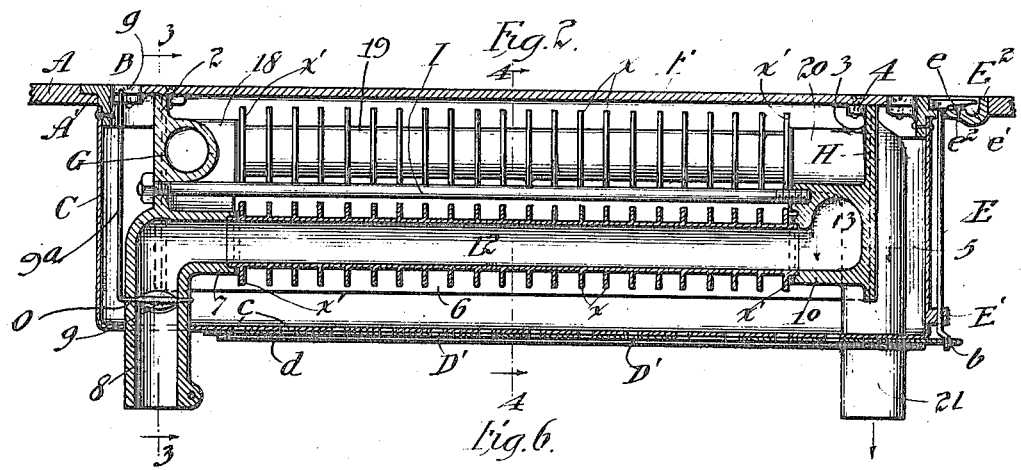
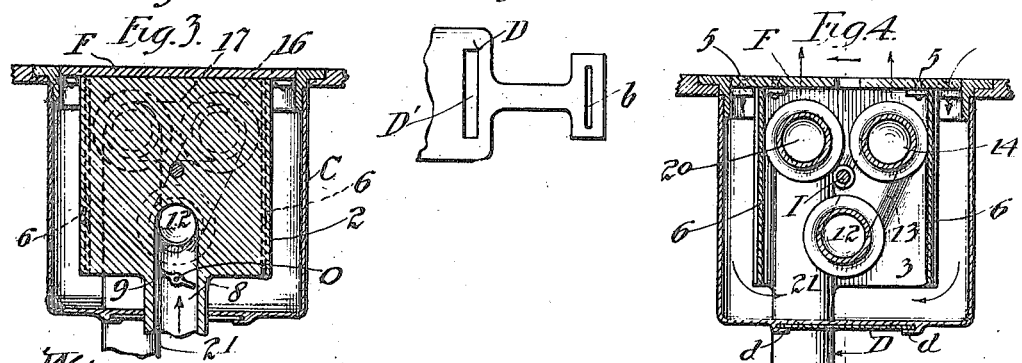
Witnesses:
W. T. Smith
Florence Mitchell
Inventor:
Thomas Bovey
by Frank D. Thomasson
Atty.

UNITED STATES PATENT OFFICE.

THOMAS BOVEY, OF CHICAGO, ILLINOIS.

VEHICLE-HEATER.

1,194,473.

Specification of Letters Patent.

Patented Aug. 15, 1916.

Application filed February 19, 1915. Serial No. 9,289.

*To all whom it may concern:*

Be it known that I, THOMAS BOVEY, a citizen of the United States, residing at Chicago, in the county of Cook and State of Illinois, have invented new and useful Improvements in Vehicle-Heaters, of which the following is a full, clear, and exact description.

My invention relates to heating apparatus for limousines or inclosed bodies of motor driven vehicles.

The object of my invention is to utilize the exhaust gases of the engine of the vehicle or the hot water from the water jacket thereof to heat the interior of the vehicle body, and to provide a simply constructed register or radiator for the purpose that will not overheat nor burn the structure of the car in the locality where it is placed, and which can be manipulated to admit and heat cold air from the outside or to draw the colder air from the lower part of the limousine or body and heat and expel the heated air back into the same. This I accomplish by the simple and inexpensive means, substantially as hereinafter fully described, and as pointed out in the claims.

In the drawings: Figure 1 is a plan view of a fragment of the floor of an automobile and of my improved register located therein. Fig. 2 is a longitudinal section of the same taken on dotted line 2—2, Fig. 1, looking in the direction indicated by the arrows. Fig. 3 is a transverse section taken on dotted line 3—3, Fig. 2, looking in the direction indicated by the arrows. Fig. 4 is a similar view taken on dotted line 4, 4, looking in the direction indicated by the arrows. Fig. 5 is a longitudinal section of a fragment of the header of the register taken on dotted line 5—5, Fig. 2. Fig. 6 is a detail view showing a plan of a fragment of the damper located in the bottom of the casing of the register. Fig. 7 is a vertical section of a modified form of my improved register suitable for the dash-board of the automobile, or front or rear walls of a seat therein.

Referring to the drawings, A represents a fragment of the floor of a limousine or body of an automobile having a rectangular opening therein. This opening has its margins rabbeted, as at A', and a rectangular angle-iron frame B is seated therein whose upper horizontal flange rests in the rabbeted edge of said opening and whose vertical flange or body extends down through the floor a short distance.

C represents the sheet-metal trough-shaped casing of my improved register, and the upper edges of its end and side-walls inclose and are secured against the portion of the vertical flange of frame B depending below the floor. The bottom of this casing is provided with a longitudinally arranged series of equi-distant transverse slots $c$ through which the outer air is admitted to the register, and these slots $c$ are opened or closed to regulate this ingress of air by a longitudinally reciprocable damper D, which latter consists of a flat plate the width of which exceeds the length of the series of slots $c$, and the straight parallel sides of which are slidably set in longitudinally disposed guide-ways $d$ depending from the bottom of the casing, substantially as shown. At one end this damper D is provided with a narrow extension which extends beyond the end of the casing, and its extremity is provided with a widened head that has a transversely elongated opening $b$ therein that is engaged by the lower extremity of the crank-shaped lower end of a vertical rock-shaft E. Shaft E extends up through a suitable bearing E' projecting from the wall of the casing and through the bottom of a basin-shaped end-extension $E^2$ of frame B, and is provided with a laterally projecting arm $e$ on its upper end by means of which it is turned to such an extent as to move the damper longitudinally, through the medium of the crank on its lower end. If desired, extension $E^2$ may be provided with a semi-circular groove in its bottom under the outer end of arm $e$ so as to make it easier to grasp the end of said arm, and, if desired, said arm $e$ may have a teat $e'$ projecting downward from its center of length which is adapted to engage one of a semi-circular series of holes $e^3$ arranged in the bottom of the extension $E^2$, substantially as shown in Fig. 2 of the drawings. Damper D is provided with a series of equi-distant transverse slots D' corresponding in dimensions and spaced the same distance apart as slots $c$ in the bottom of the casing, with which they are adapted to register when the damper is adjusted to permit the ingress of air into the register.

The inner angles of frame B are provided with corner lugs $f$ that project inwardly from said frame so that their upper flat surfaces are below the plane of the top of the frame and so that the upper surface of the cover F, the corners of which rest upon and are secured to said lugs $f$, may be flush with the upper surface of the marginal-frame B, inclosing the same. This cover has the rectangular central portion thereof provided with openings that are, preferably, so shaped and arranged as to produce a fretwork of pleasing design, and it has rectangular-shaped solid portions inclosing this fretwork and has its outer edges cut away so as to leave a space between said rectangular solid portion (except at the corners and midway its length) in such manner as to leave longitudinally elongated openings $g$ along the sides, and transversely elongated openings $g'$ at the ends of the cover.

The heat radiating devices for my improved register comprise two headers G and H, and pipes connecting the same. These headers each include a vertically disposed rectangular plate 2 and 3, respectively, which are of a width less than the width of the casing, and of a height less than the depth of the casing so that their lower edges will terminate about the same distance from the bottom of the casing as their vertical edges are from the vertical side-walls of the same. The upper edges of these header-plates 2 and 3 are provided with lugs 4 that are secured to the underside of cover F by means of suitable screws 5, one at one end of the casing and the other at the other end of the casing, from which they are separated a suitable distance, substantially as shown in the drawings. Near the vertical edges of the header-plates and in a vertical plane between the same and lugs 4, the opposing surfaces of said plates are provided with vertical grooves in which the end edges of vertically disposed sheet metal plates 6 are seated and retained by drawing the header-plates together, through the medium of longitudinally disposed and centrally placed tie-bolts I. At one end of the register, plate 2 is provided with a tubular stub 7 that projects longitudinally toward header-plate 3 at the other end of the register, and this tubular stub 7 is connected with and forms a continuation of a vertical intake-pipe 8, which latter, above the plane of the bottom of the casing, has a butterfly-valve 9 therein, the end O of the spindle of which nearest the adjacent end of the casing extends through its bearings and is then bent vertically and form an extension-rod $9^a$ which terminates within the transversely elongated open space $g$ between the end of the cover and the marginal-frame B where its extremity can be grasped and moved to turn the butterfly-valve and regulate the supply of heated exhaust products coming from the engine (not shown) through stub 7. Header-plate 3, at the end of the casing opposite plate 2, has a tubular stub 10 that projects toward stub 7, and is in axial alinement therewith, and the opposing end edges of these stubs 7 and 10 are rabbeted, and the ends of a connecting pipe 12 are seated in said rabbets and connect said stubs.

Stubs 7 and 10 and connecting-pipe 12 are disposed midway between side-plates 6, and stub 10 is connected by a passage 13, extending upward and outward toward one side of the casing, and communicating with the inner end of a superposed stub 14, which is integral with header-plate 3 and extends horizontally toward header-plate 2. This stub 14 is connected by means of a longitudinally disposed pipe 15 with a tubular stub 16 made integral with and projecting from header-plate 2 in axial alinement therewith, and the inner end of the bore of stub 16 is connected by a lateral passage 17 with the inner end of the bore of a tubular stub 18, which latter is also integral with header-plate 2 and projects longitudinally therefrom, preferably, in the same horizontal plane as stub 16, toward the opposite header-plate 3. Stub 18 is connected by means of a longitudinally disposed pipe 19 with a tubular stub 20 which latter is made integral with and projects from header-plate 3 in alinement therewith, and the inner end of the bore of stub 20 connects with the upper end of the bore of a vertical discharge-pipe 21 that is made integral with said header-plate, and extends down below said plate and out through a suitable opening in the bottom of the casing alongside the end-extension of the damper which is made narrower to avoid the same.

From the drawings, it will be noticed that header-plate 2 and stubs 7, 16 and 18 are cast in one piece, and that header-plate 3 and stubs 10, 14 and 20 are cast in one piece, when, therefore, the side-plates 6 are interposed between the two header-plates and have their end edges seated in the vertical grooves located next the vertical edges thereof and the two castings are connected and drawn together by bolt I, a perfect inclosed heating chamber is provided for the heated pipes 12 and 19, and when the header-plates are secured to the underside of the cover, and the cover seated in marginal-frame B so that intake-pipe 8 and discharge-pipe 21 will extend down through the opening made to accommodate their passage in the casing, my improved heater and register will be properly assembled and ready for use. Pipes 12 and 19 are, preferably, provided with a series of circumferential flanges $x$, $x$, as shown in the drawings, or with other heat radiating projections, and in order to prevent the possibility of the heated products of combustion from leaking from the joints between the pipes and stubs, and from thence into the limousine, suitable packing rings 23 are interposed between the annular edges of said stubs and the end circumferential flanges $x'$ of each pipe,—the latter being so placed that when the header-plates are drawn together the packing 23 is compressed, and a perfectly tight joint is made between them and the ends of the stubs.

In operation, the heated products of combustion enter the register through pipe 8 and stub 7, then flow through pipe 12 into stub 10 and from thence through passage 13, stub 14, pipe 15 and stub 16, and from the latter through passage 17 into stub 18, pipe 19 and stub 20, and then out through discharge-pipe 21. These parts get heated and heat the air within the space or heating chamber inclosed by the header-plates and the side-walls 6, and the heated air rises and is discharged through the fretwork of the cover into the limousine. While the heated air is being discharged, cooler air to take the place thereof is being drawn into said heating chamber from below, and if damper D is closed the air from the lower part of the limousine will be drawn down through the open spaces bordering the edges of the cover outside of the side-plates 6, and the header-plates will pass under the lower edges thereof, and becoming heated will be discharged back into the limousine again. When it is desired to furnish fresh air to the limousine, the damper D is adjusted, according as desired.

What I claim as new is:

1. A heater of the kind specified comprising a perforated cover having a marginal frame, an outer imperforate rectangular casing secured thereto and depending therefrom having damper closed openings in its bottom, an inner depending bottomless rectangular frame separated all around from said outer imperforate casing and providing a continuous cooler air chamber surrounding the same, and a series of suitably disposed heating pipes within said inner rectangular structure.

2. A device of the kind specified comprising a marginal frame, a perforated cover seated in said frame, a rectangular casing secured to and depending from said frame having a series of openings in its bottom, a damper controlling said openings, an inner imperforate rectangular structure secured to and depending from said cover and separated both at its sides and ends from said casing to provide a continuous cooler air chamber around the same, and a series of suitably disposed heating pipes within said inner rectangular structure.

3. A device of the kind specified comprising a marginal frame, a perforated cover seated in said frame, a rectangular casing secured to and depending from said frame having a series of openings in its bottom, a damper controlling said openings, an inner imperforate rectangular structure secured to and depending from said cover and separated both at its sides and ends from said casing to provide a continuous cooler air chamber around the same; said inner imperforate structure consisting of side-plates and end header-plates one of which latter has an inlet passage and the other an outlet passage, and both of which have return passages therein, and interposed connecting pipes the ends of which are secured in the ends of said passages.

In witness whereof I have hereunto set my hand this 16th day of February, 1915.

THOMAS BOVEY.

Witnesses:
 FRANK D. THOMASON,
 FLORENCE MITCHELL.